United States Patent [19]

Terui

[11] Patent Number: 4,827,718
[45] Date of Patent: May 9, 1989

[54] CONTROL SYSTEM FOR CONTROLLING ACTUATOR TO CONTROL OPERATION OF INTERNAL COMBUSTION ENGINE

[75] Inventor: Toshiyasu Terui, Iwata, Japan

[73] Assignee: Kabushiki Kaisha, Japan

[21] Appl. No.: 161,909

[22] Filed: Feb. 29, 1988

[30] Foreign Application Priority Data

Mar. 2, 1987 [JP] Japan .................................. 62-45285

[51] Int. Cl.$^4$ ............................................. F02B 27/02
[52] U.S. Cl. ........................................ 60/312; 60/313;
123/359; 123/479; 123/487
[58] Field of Search .................. 60/313, 312; 123/479,
123/487, 357, 359

[56] References Cited

U.S. PATENT DOCUMENTS 3,895,611  7/1975  Endo .................................... 123/487
4,196,702  4/1980  Bowler ............................... 123/487

Primary Examiner—Douglas Hart
Attorney, Agent, or Firm—Laff, Shitesel, Conte & Saret

[57] ABSTRACT

A control system for controlling an actuator which controls operation of an internal combustion engine in compliance with a target value varying continuously depending on the operation condition of the engine. The control system comprises: means for detecting the operation condition of the engine; processor means for calculating and setting a target value depending on the operation condition of the engine; detector means for detecting the up-to-date value of the actuator; discriminator means for discriminating a difference between the target value and the up-to-date value to supply an output signal for controlling the actuator; a driver for energizing the actuator in response to the output signal from the discriminator means; and a counter means for counting the recurring times of the up-to-date value deviating from an allowable range which has been set to span a constant width while taking the target value as a central value, the counter means generating a signal for stopping the actuator when the recurring number counted thereby reaches a pre-set number so that the actuator is stopped tentatively for a predetermined period.

9 Claims, 4 Drawing Sheets

CONTROL SYSTEM FOR CONTROLLING ACTUATOR TO CONTROL OPERATION OF INTERNAL COMBUSTION ENGINE

BACKGROUND OF THE INVENTION

1. Field of the Invention:

The present invention relates generally to a control system for controlling an engine for a motor vehicle, and particularly to a control system for controlling an actuator which controls operation of an internal combustion engine to follow-up a target value varying continuously depending on the operation condition of the engine.

2. Prior Art Statement:

During cruising of a vehicle, the rotation speed of the engine is changed greatly and the loading applied on the engine is also changed within a wide range. In consideration of the foregoing, it has been proposed to detect the operation conditions of the engine and to open or close a variety of control valves depending on the result of detection so as to achieve optimum control of the engine. For example, Japanese Patent Laid-Open Publication No. 126222/1987 teaches a system wherein an exhaust gas control valve is disposed at a vicinity of the downstream open end of the exhaust pipe, and the exhaust gas control valve is fully opened to utilize the kinetic effect of the exhaust system at the maximum extent so as to increase the output of the engine when the engine is operated within its high speed range. The exhaust gas control valve is closed to about one half of the full open angle, when the engine is operated within its medium speed range, to prevent formation of trough of torque due to the reverse effect of kinetics in the exhaust system. Another proposal has been made to change the effective length of the exhaust pipe by the provision of control valves on the connection pipes connecting the plural exhaust pipes and by opening or closing the control valves depending on the change in rotation speed of the engine.

During the course of opening and closing these valves so that the control valves take the desired opening angles in compliance with the change in operation condition of the engine, there might arise a trouble where any one of the motors or actuators serving to open and close the control valves rotates in the obverse and reverse directions alternatively and repeatedly as shown in FIGS. 4(A) and 4(B). FIG. 4(A) shows a case where the loading applied on the actuator is relatively large and some slack is present along the power transmission elements. In this case, the actuator is rotated in the reverse direction due to the tension in the wire or other power transmission elements after the electric current flowing through the actuator is cut off when the opening angle of a control valve takes a up-to-date opening angle $\theta$ which is included in the allowable range spanning a constant width determined while taking the target value as a central value. The opening angle of the valve is thus deviated from the allowable range $(\text{H})$ by such a rotation of the actuator, and an electric current energizing the actuator is flown again. As a result, undesirable alternating rotation of the actuator in the obverse and reverse directions are repeated. On the contrary, FIG. 4(B) shows a case where the loading applied on the actuator is too small and the inertia of the actuator is excessively large. In such a case, the actuator is stopped after the control valve rotates beyond the allowable range $(\text{H})$ of the target valve. Then, the actuator is energized again to rotate the valve in the reverse direction and stopped after the control valve rotates beyond the opposing limit of the allowable range $(\text{H})$. Endlessly recurring operations are thus repeated.

The resulting endless alternating rotations of the actuator in the obverse and reverse directions lead to repeated flowing of high electromotive currents through the actuator to increase excessive temperature raise thereof, whereby the lifetime of the actuator is reduced.

OBJECTS AND SUMMARY OF THE INVENTION

An object of this invention is to provide a control system for controlling an actuator which controls operation of an internal combustion engine in compliance with a target value varying continuously depending on the operation condition of the engine, wherein repeated energization of the actuator is prevented to obviate undesirable temperature raise and damage of the actuator.

A more specific object of this invention is to provide such a control system wherein energization of the actuator is stopped when the number of repeated energization of the actuator reaches a pre-set number.

With the aforementioned objects in view, the present invention provides a control system for controlling an actuator which controls operation of an internal combustion engine to follow-up a target value varying continuously depending on the operation condition of said engine, said control system comprising:

means for detecting the operation condition of said engine;

processor means for calculating and setting a target value depending on said operation condition of said engines;

detector means for detecting the up-to-date value of said actuator;

discriminator means for discriminating a difference between said target value and said up-to-date value to supply an output signal for controlling said actuator;

a driver for energizing said actuator in response to said output signal from said discriminator means; and a counter means for counting the recurring times of the up-to-date value deviating from an allowable range which has been set to span a constant width while taking said target value as a central value, said counter means generating a signal for stopping said actuator when the recurring number counted thereby reaches a pre-set number so that said actuator is stopped tentatively for a predetermined period.

The actuator may be a servomotor or a stepping motor. In a preferred embodiment, the counting means is reset in compliance with the variation in the target value.

DESCRIPTION OF THE APPENDED DRAWINGS

DESCRIPTION OF PREFERRED EMBODIMENT

The above and other objects and advantages of this invention will be apparent from the following detailed description of a presently preferred embodiment of the present invention.

Figure 1:
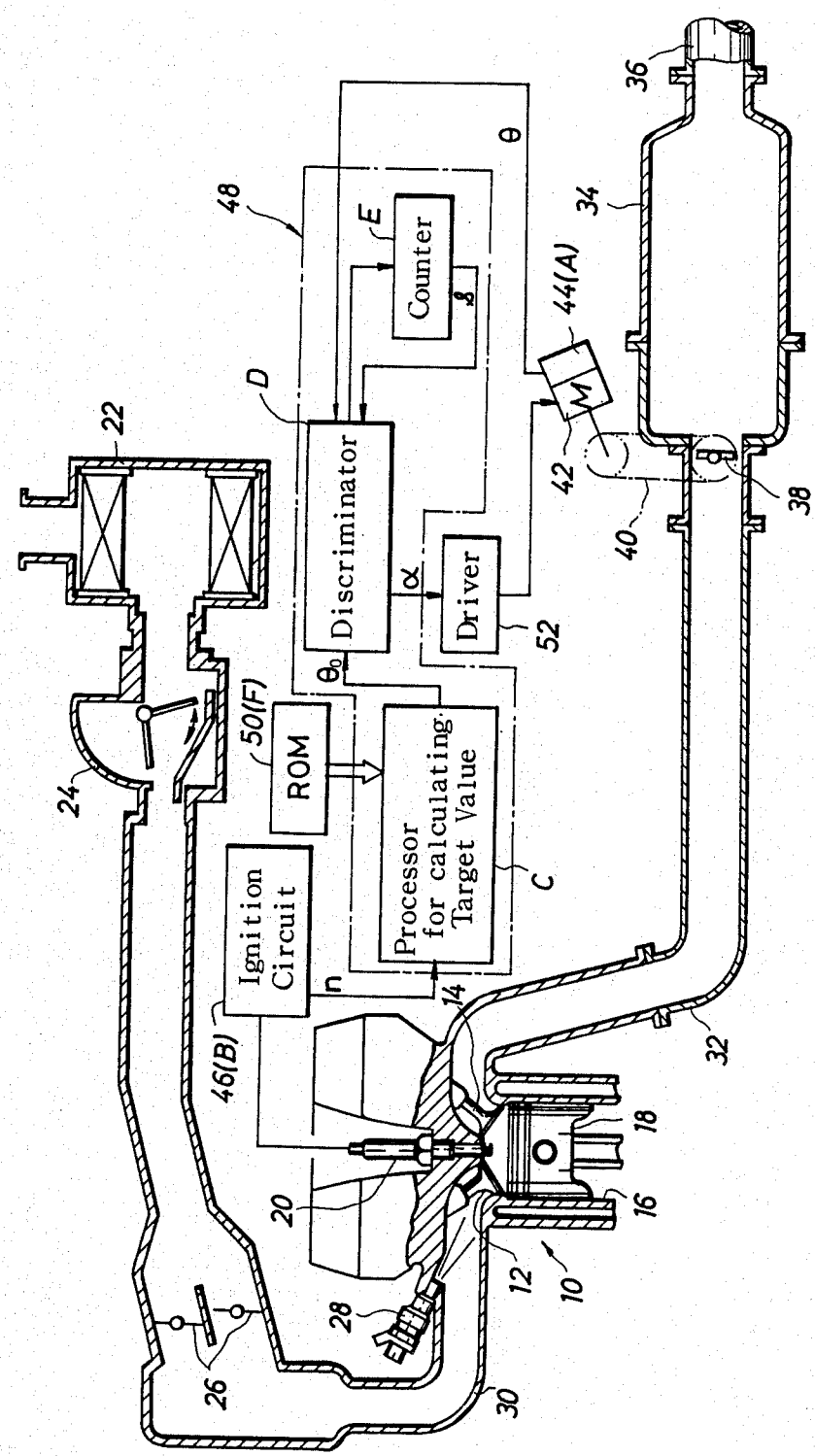
FIG. 1 is a schematic view showing an embodiment of the control system, according to this invention, which is associated with an exhaust system of an internal combustion engine.

Initially referring to FIG. 1, a four-cycle internal combustion engine is denoted by 10, and has an intake valve 12 and an exhaust valve 14 which are opened and closed by valve actuating means (not shown) at predetermined timing. The engine 10 is further provided with a cylinder 16, a piston 18 which cooperates with the cylinder 16, and an ignition plug 20 which ignites the compressed fuel-air mixture in the cylinder 16. The intake system of the engine 10 includes an air cleaner 22, an air flow meter 24, a throttle valve 26 and a fuel injection valve 28. Air is sucked through the air cleaner 22 at a flow rate determined by the rotation speed of the crank shaft (not shown) of the engine 10 and the open angle of the throttle valve 26. The flow rate of the sucked air is measured by the air flow meter 24. The optimal quantity of fuel corresponding to the sucked air quantity and adapted to the operation conditions (for example, temperature of the engine) is calculated by a computer (not shown) and supplied through a fuel injection valve 28 which injects the supplied fuel into the intake pipe 30.

The exhaust system includes a first exhaust pipe 32 having one end opened and closed by the exhaust valve 14, an expansion chamber 34 connected with the other or downstream end of the first exhaust pipe 32, and a second exhaust pipe 36 connected to the downstream end of the expansion chamber 34. A control valve, a butterfly valve 38 in the illustrated embodiment, is disposed at a vicinity of the downstream end of the fist exhaust pipe 32 to control the flow of exhaust gases. The control valve 38 is opened and closed by an actuator, a DC servomotor 42 in the illustrated embodiment, through a wire 40. The servomotor 42 is fitted with a potentiometer 44 which serves as the means A for detecting the up-to-date open angle $\theta$ (i.e. the up-to-date value) of the control valve 38 by detecting the angular position of the servomotor 42.

Figure 2:
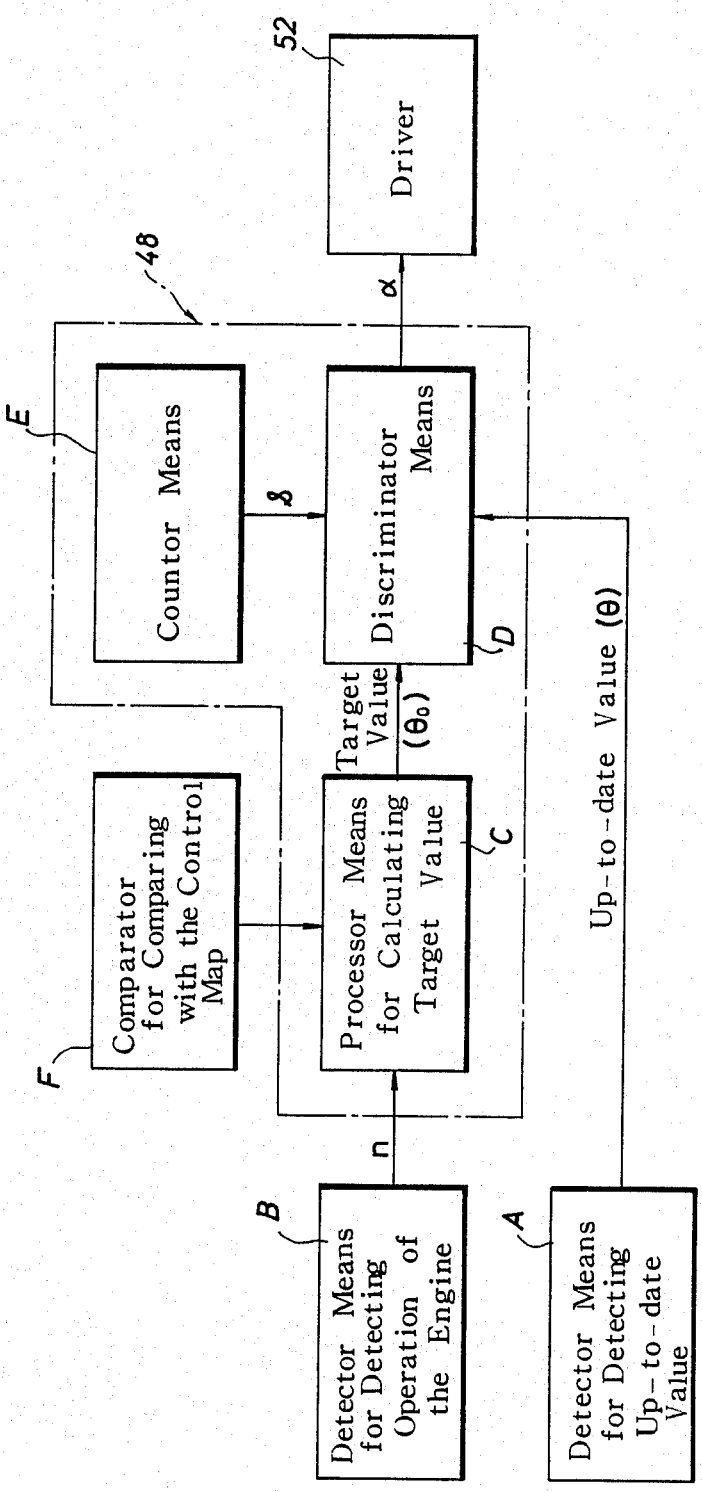
FIG. 2 is a block diagram showing the control system of FIG. 1.

The ignition plug 20 is connected to an ignition circuit 46 which is utilized as the means B for detecting the operation condition of the engine 10. The rotation speed n of the engine 10 is detected from the ignition circuit 46. A central processor unit (CPU) or digital microprocessor is generally denoted by 48 and includes a first processor C for calculating and setting the target value, a discriminator D, and a counter E. The first processor C reads-out the data corresponding to the rotation speed n from a read-only memory (ROM) which stores a control map, and calculates the target open angle $\theta_0$ of the control valve 38. The ROM 50 is shown as the comparator means F for comparing with the control map in FIG. 2. The discriminator D discriminates the difference between the target open angle $\theta_0$ and the up-to-date open angle $\theta$ to generate a control signal $\alpha$ which is fed to a driver 52. When the signal $\alpha$ is a signal for controlling the electric current flowing through the servomotor 42, for example, by the pulse width modulating (PWM) system, the duty ratio of the current flowing through the servomotor 42 is changed depending on the difference between $\theta_0$ and $\theta$, and the flow direction of the electric current is determined so that the open angle of the control valve 38 is increased when $\theta$ is smaller than $\theta_0$ and the open angle of the control valve 39 is decreased when $\theta$ is larger than $\theta_0$.

The counter E counts the shift times of the difference $\theta - \theta_0$ shifting from positive value to negative value, and vice versa, or the times when the difference $\theta - \theta_0$ takes zero, and generates a stop signal s when the count number reaches a pre-set number a (for example nine). The pre-set number a in the counter E is reset as the target number $\theta_0$ is varied. The discriminator D stops the servomotor 42 in response to the stop signal s.

Figure 3:
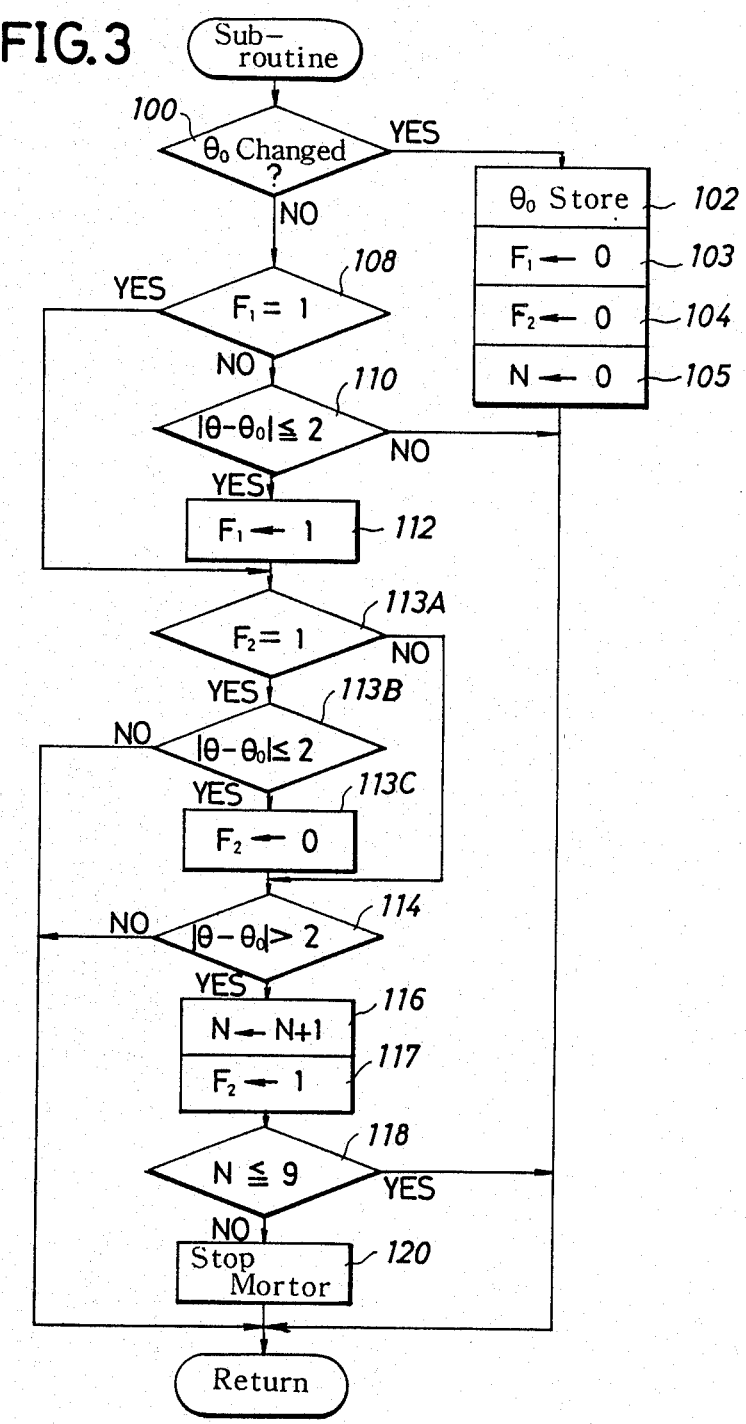
FIG. 3 is a flow chart showing the operation of the control system of FIG. 2.
Figure 4:
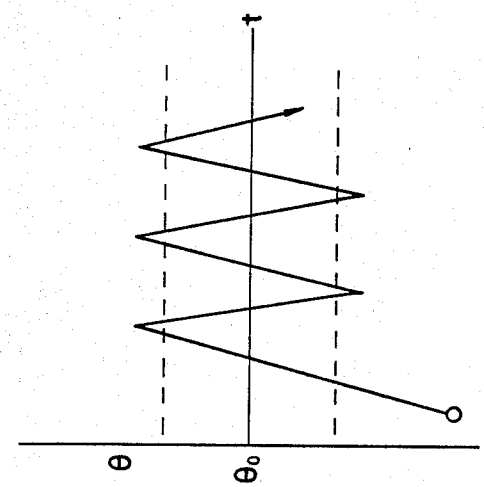
FIGS. 4(A) and 4(B) are graphs showing the cases in which haunting of the actuator take place.
Figure 4:
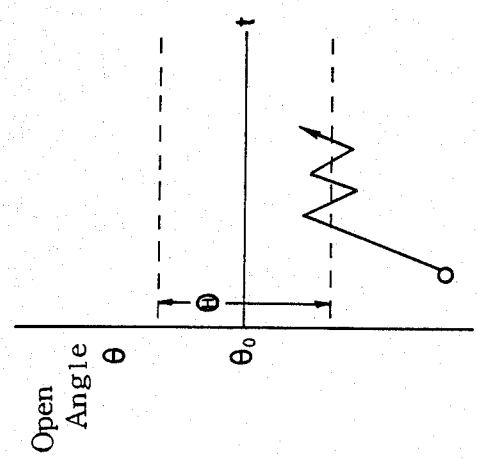

The operation of the illustrated embodiment will now be described with reference to FIG. 3. The illustrated embodiment operates to repeat the operation sequence including the sub-routine shown in FIG. 3 within every predetermined time period, for example within 2 milliseconds. As shown in FIG. 3, the CPU 48 initially calculates the target value $\theta_0$ by the processor means C for calculating the target value. The target value $\theta_0$ changes as the rotation speed n of the engine is varied. When the variation in target value $\theta_0$ is less than the allowable range of $\pm\Delta\theta$, the variation is neglected. Whereas the variation is larger than the allowable range $\pm\Delta\theta$, such a variation is judged as a significant variation (Step 100). When the variation is judged as significant, the CPU 48 changes the target value $\theta_0$ to a new target value (Step 102) and the flags $F_1$ and $F_2$ and the count number N in the counter means E are reset to zero (Steps 103, 104 and 105). The CPU 48 is then compares the up-to-date value $\theta$ with the target value $\theta_0$. As shown in FIG. 4, the allowable range or target zone spanning a constant width may be set to judge that the up-to-date value is agreed with the target value at a time when the up-to-date value $\theta$ enters the target zone (H).

When the up-to-date value $\theta$ is agreed with the target value $\theta_0$, the CPU 48 discriminates whether the flag $F_1$ is 1 or not (Step 108), and waits until the up-to-date value $\theta$ is agreed with the target value $\theta$ or the up-to-date value $\theta$ enters the target zone (H) when the flag $F_1$ is not 1 (Step 110). As the up-to-date value $\theta$ is agreed with the target value, the flag $F_1$ is set to 1 (Step 112), and the servomotor 42 is stopped. When the target value $\theta_0$ is changed (Step 100), the flags $F_1$ and $F_2$ and the counter means E is reset to the initial stage and the changed target value $\theta_0$ is stored (Steps 102 to 105).

Then, the CPU 48 discriminates whether the flag $F_1$ is 1 or not (Step 113A). When $F_1$ is 1, the CPU 48 discriminates whether the up-to-date value $\theta$ is agreed with the target value $\theta_0$ or not (Step 113B). In other words, the CPU 48 discriminates whether the up-to-date value $\theta$ is included within the allowable range (H). When the up-to-date value $\theta$ is agreed with the target value $\theta_0$, the flag $F_2$ is set to zero (Step 113C).

When the up-to-date value $\theta$ is deviated from the target value $\theta_0$ (Step 114), the counter E adds 1 to the counted number N and the added number is stored as a new count number N (Step 116) and simultaneously sets the flag $F_2$ to 1 (Step 117). Steps 100 to 118 are repeated until the new count number N reaches the pre-set number a, and as the count number N reaches the pre-set number a (Step 118) the counter E generates the stop signal s (Step 120). The driver 52 stops the servomotor 42 in response to the stop signal s. The aforementioned operation sequence is repeated as the target value $\theta_0$ is changed.

In this embodiment, the present invention is applied for actuating the exhaust gas control valve 38 disposed at the downstream end of the exhaust pipe 32 so that the valve 38 is opened when the engine is operated within its high speed range and the valve 38 is closed when the engine is operated within its medium speed range to prevent formation of trough of torque. However, the present invention may be applied to control other control valves. For example, a control valve for controlling the effective pipe length of an intake pipe may be controlled within the scope and spirit of this invention.

Although the operation condition of the engine is detected by measuring the rotation speed of the engine in the described embodiment, the operation condition of the engine may also be detected by means of other parameters, such as the open angle of the throttle valve, the reduced pressure in the intake pipe, or the temperature.

Although the decision at the step 110 is made by judging whether the count number N reaches the pre-set number a or not until the target value $\theta_0$ is changed in the illustrated embodiment, the system of the present invention may be modified so that the decision at the step 110 is made by judging whether the count number N reaches the pre-set number within a predetermined time period.

What is claimed is:

1. A control system for controlling an actuator which controls operation of an internal combustion engine in compliance with a target value varying continuously depending on the operation condition of said engine, said control system comprising:
   means for detecting the operation condition of said engine;
   processor means for calculating and setting a target value depending on said operation condition of said engine;
   detector means for detecting the up-to-date value of said actuator;
   discriminator means for discriminating a difference between said target value and said up-to-date value to supply an output signal for controlling said actuator;
   a driver for energizing said actuator in response to said output signal from said discriminator means; and
   a counter means for counting the recurring times of the up-to-date value deviating from an allowable range which has been set to span a constant width while taking said target value as a central value, said counter means generating a signal for stopping said actuator when the recurring number counted thereby reaches a pre-set number so that said actuator is stopped tentatively for a predetermined period.

2. The control system according to claim 1, wherein said actuator is a servomotor.

3. The control system according to claim 1, wherein said actuator is a stepping motor.

4. The control system according to claim 1, wherein said counting means is reset in compliance with the variation in said target value.

5. The control system according to claim 1, wherein said engine has an exhaust pipe and an exhaust gas control valve disposed at the vicinity of the downstream end of said exhaust pipe, and wherein said exhaust gas control valve is opened and closed by said actuator.

6. The control system according to claim 5, wherein said exhaust gas control valve is a butterfly valve.

7. The control system according to claim 1, wherein said means for detecting the operation condition of said engine comprises an ignition circuit for igniting said engine.

8. The control system according to claim 1, wherein said processor means, said discriminator means and said counter means are digital microprocessors.

9. The control system according to claim 1, wherein said driver controls the electric current flowing through said actuator by pulse width modulation.

* * * * *